US010954998B1

(12) United States Patent
Moscetti et al.

(10) Patent No.: US 10,954,998 B1
(45) Date of Patent: Mar. 23, 2021

(54) THRUST BEARING ASSEMBLY AND A TURBOCHARGER INCLUDING THE SAME

(71) Applicant: BorgWarner Inc., Auburn Hills, MI (US)

(72) Inventors: Jason P. Moscetti, Hendersonville, NC (US); Zachary S. Ashton, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/588,184

(22) Filed: Sep. 30, 2019

(51) Int. Cl.
| F16C 17/10 | (2006.01) |
| F16C 17/08 | (2006.01) |
| F02B 37/16 | (2006.01) |
| F16C 33/12 | (2006.01) |
| F16C 39/02 | (2006.01) |

(52) U.S. Cl.
CPC ............ F16C 17/08 (2013.01); F02B 37/164 (2013.01); F16C 33/122 (2013.01); F16C 39/02 (2013.01)

(58) Field of Classification Search
CPC ........ F01D 25/168; F01D 25/186; F02C 7/06; F16C 17/04; F16C 17/10; F16C 17/107; F16C 2360/24; F16C 27/02
See application file for complete search history.

(56) References Cited

U.S. PATENT DOCUMENTS

| 2,877,945 A * | 3/1959 | Trebilcock ............... F16C 17/04 |
| | | 416/171 |
| 3,360,926 A * | 1/1968 | Parr ........................ F03B 17/02 |
| | | 60/496 |
| 3,941,437 A | 3/1976 | MacInnes et al. |
| 4,655,043 A | 4/1987 | McInerney |
| (Continued) |

FOREIGN PATENT DOCUMENTS

| JP | 5218822 B2 | 6/2013 |
| JP | 5482350 B2 | 5/2014 |
| (Continued) |

OTHER PUBLICATIONS

English language abstract and machine-assisted English language translation for JP 5218822 extracted from espacenet.com database on Oct. 7, 2019, 9 pages.

(Continued)

*Primary Examiner* — Phillip A Johnson
(74) *Attorney, Agent, or Firm* — Howard & Howard Attorneys PLLC

(57) ABSTRACT

A turbocharger includes a bearing housing defining an interior. The turbocharger also includes a shaft and a thrust bearing assembly disposed about the shaft. The thrust bearing assembly includes a thrust plate defining a bore configured to receive the shaft and having a first thrust surface which is integral. The thrust bearing assembly also includes a bearing having a second thrust surface which is integral. The thrust bearing assembly further includes a washer (Continued)

disposed between the thrust plate and the bearing. The washer has a third thrust surface which is integral, and an opposite fourth thrust surface which is integral. The third thrust surface faces the first thrust surface for engagement with the first thrust surface, and the fourth thrust surface faces the second thrust surface for engagement with the second thrust surface.

12 Claims, 4 Drawing Sheets

(56) References Cited

U.S. PATENT DOCUMENTS

| | | | |
|---|---|---|---|
| 4,726,695 | A | 2/1988 | Showalter |
| 6,017,184 | A | 1/2000 | Aguilar et al. |
| 6,024,495 | A | 2/2000 | Loos et al. |
| 9,470,240 | B2 | 10/2016 | Uneura |
| 9,581,043 | B2 | 2/2017 | Uneura et al. |
| 9,638,244 | B2 * | 5/2017 | Duecker-Schulz ... F16C 17/045 |
| 2015/0093233 | A1 * | 4/2015 | Daguin ............... F01D 25/162 415/1 |
| 2017/0067472 | A1 * | 3/2017 | Day ..................... F01D 25/168 |
| 2017/0342998 | A1 | 11/2017 | Uneura et al. |
| 2019/0078732 | A1 | 3/2019 | Kojima et al. |

FOREIGN PATENT DOCUMENTS

| | | |
|---|---|---|
| JP | 5807436 B2 | 11/2015 |
| WO | 2017149671 A1 | 9/2017 |

OTHER PUBLICATIONS

English language abstract and machine-assisted English language translation for JP 5482350 extracted from espacenet.com database on Oct. 7, 2019, 11 pages.

English language abstract and machine-assisted English language translation for JP 5807436 extracted from espacenet.com database on Oct. 7, 2019, 11 pages.

English language abstract for WO 2017/149671 extracted from espacenet.com database on Oct. 7, 2019, 2 pages.

* cited by examiner

THRUST BEARING ASSEMBLY AND A TURBOCHARGER INCLUDING THE SAME

BACKGROUND OF THE INVENTION

1. Field of the Invention

The present invention generally relates to a thrust bearing assembly and, more specifically, to a thrust bearing assembly for use in a turbocharger.

2. Description of the Related Art

Some vehicles include a turbocharger for an engine of a vehicle such as an automotive vehicle. An automotive turbocharger typically includes a compressor wheel housing, a turbine housing, and a bearing housing each defining interiors. Moreover, a compressor wheel is disposed in the compressor wheel housing interior and a turbine wheel is disposed in the turbine housing. The compressor wheel and the turbine wheel are on a common turbocharger shaft disposed in the bearing housing interior and supported by bearings. The turbine wheel of the turbocharger extracts energy from exhaust gas from the engine, and the extracted energy is transferred to the compressor wheel. The compressor wheel increases an intake air density into the engine, which in turn allows for a greater quantity of fuel to be burned for a given air-fuel ratio. As a result, the engine develops more power.

In typical turbocharger operation, the forces acting on the compressor wheel and turbine wheel in an axial direction move the components disposed about the shaft in one axial direction or in the opposite axial direction depending on the mode of operation of the turbocharger. Some typical turbocharges use a thrust plate with thrust washers on either side of the thrust plate to react to thrust loads associated with the axial forces. Additionally, typical turbochargers may also include a radial bearing and the thrust loads may be reacted on both sides of the radial bearing. This arrangement results in the highest load, which is in the direction of the compressor wheel, being reacted to on the turbine side of the turbocharger, which leads to poor thrust load capacity and undesirable low viscosity of fluid adjacent on the compressor side of the turbocharger.

As such, there remains a need for a thrust bearing assembly capable of withstanding axial forces in both directions, particularly when the thrust load is higher in the direction of the compressor wheel.

SUMMARY OF THE INVENTION AND ADVANTAGES

A turbocharger is disclosed which includes a bearing housing defining an interior. The turbocharger also includes a shaft disposed in the interior with the shaft extending along a longitudinal axis and a thrust bearing assembly disposed about the shaft. The thrust bearing assembly includes a thrust plate defining a bore configured to receive the shaft and having a first thrust surface which is integral. The thrust bearing assembly also includes a bearing having a second thrust surface which is integral and a washer disposed between the thrust plate and the bearing. Moreover, the washer includes a third thrust surface which is integral, and an opposite fourth thrust surface which is integral. The third thrust surface faces the first thrust surface for engagement with the first thrust surface for supporting an axial load along the longitudinal axis in a first direction, and the fourth thrust surface faces the second thrust surface for engagement with the second thrust surface for supporting an axial load along the longitudinal axis in a second direction.

Accordingly, the turbocharger including a washer which includes a third thrust surface for engagement with the first thrust surface of the thrust plate for supporting an axial load along the longitudinal axis in a first direction and a fourth thrust surface for engagement with the second thrust surface of the bearing for supporting an axial load along the longitudinal axis in a first direction establishes an optimized thrust bearing system for withstanding axial forces in both directions, particularly in the compressor direction where the thrust load is higher. This arrangement also allows for a size reduction in the axial direction and weight reduction, which leads to enhanced vehicle performance and cost reduction.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION OF THE INVENTION

Figure 1:
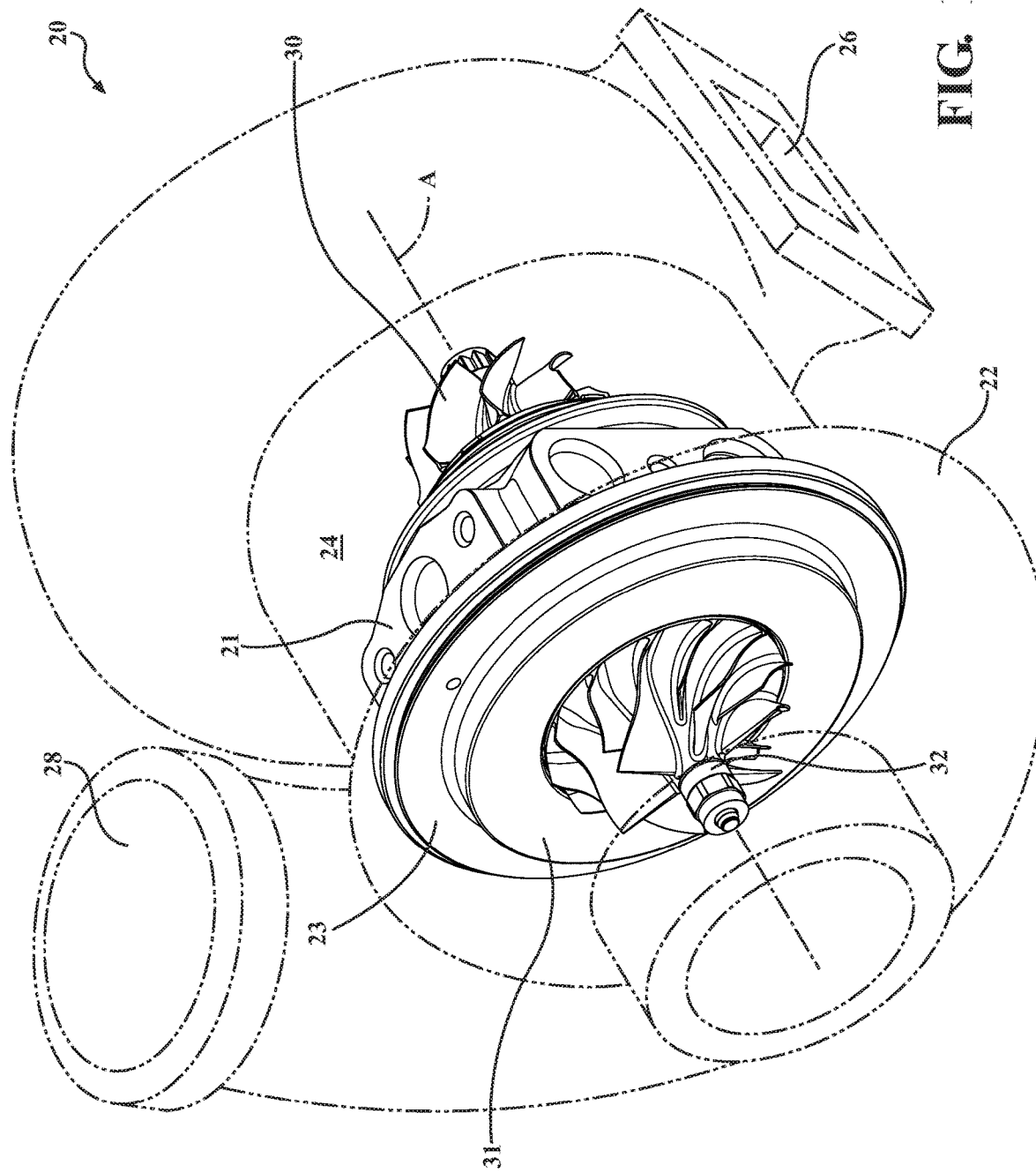
FIG. 1 is a perspective view of a turbocharger having a bearing housing.

With reference to the Figures, wherein like numerals indicate like parts throughout the several views, a turbocharger 20 is generally shown in FIG. 1. The turbocharger 20 includes a bearing housing 21 which defines an interior 24. The turbocharger has an inlet 26 to receive exhaust gas from an internal combustion engine (not shown) and an outlet 28. The turbocharger 20 also includes a rotatable turbine wheel, generally indicated at 30, disposed in a turbine housing 22 and a rotatable compressor wheel, generally indicated at 31, disposed in a compressor wheel housing 23. The turbocharger 20 further includes a rotatable turbocharger shaft 32 coupled to the turbine wheel 30 and the compressor wheel 31.

Figure 2:
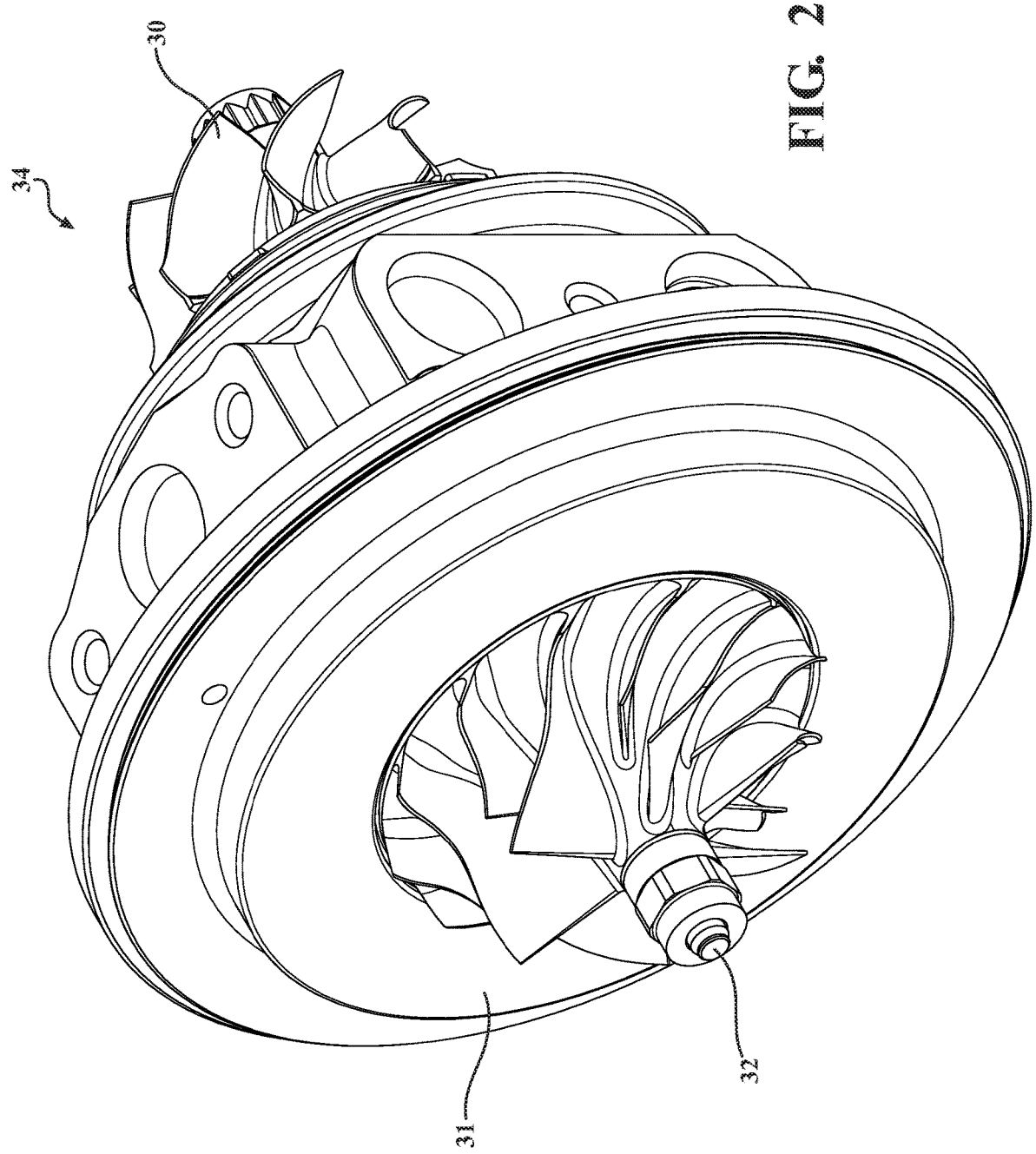
FIG. 2 is a perspective view of a thrust bearing assembly.

Referring to FIGS. 1 and 2, the shaft 32 is disposed in the interior 24 with the shaft 32 extending along a longitudinal axis A. The turbine wheel 30 is solidly affixed to one end of the turbocharger 20 shaft 32, becoming a shaft 32 and wheel assembly, and the compressor wheel 31 is coupled to the other end of the turbocharger 20 shaft 32 by a suitable mechanism, such as threads or a nut.

Figure 3:
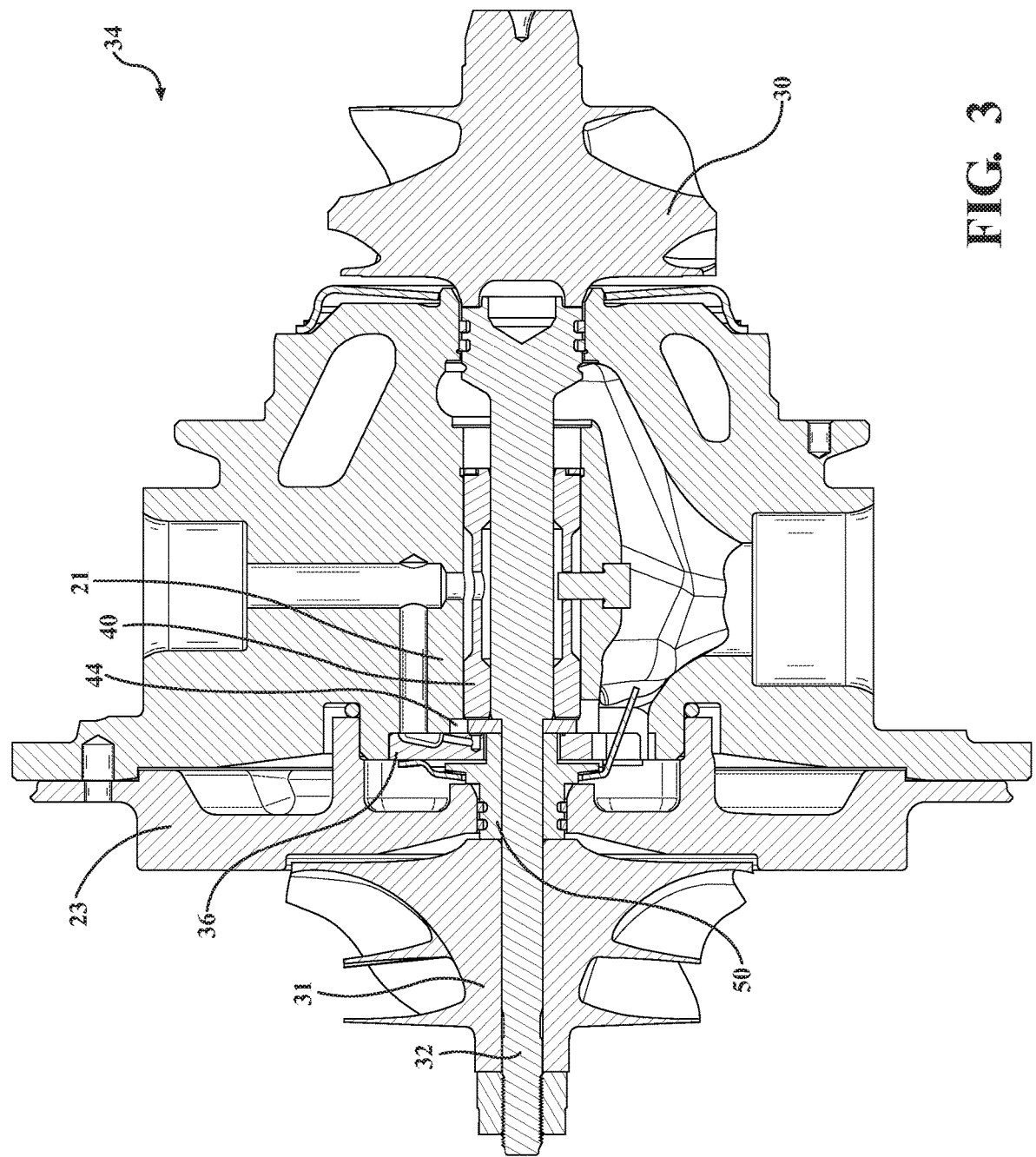
FIG. 3 is a cross-sectional view of the thrust bearing assembly.

In the example illustrated in FIG. 3, the turbocharger 20 also includes a thrust bearing assembly 34 disposed about the shaft 32. The thrust bearing assembly 34 includes a thrust plate 36. The thrust plate 36 defines a bore configured to receive the shaft 32. In one example, the thrust plate 36 is configured to prevent fluid from entering a sealing area of the shaft 32. Additionally, the thrust plate 36 may be comprised of any material including, but not limited to, steel, copper, bronze, and/or polymer. In the example illustrated in FIGS. 4 and 5, the thrust plate 36 has a generally rectangular cross-section. However, it is also contemplated that the thrust plate 36 may have any other cross-sectional shape such as circular, oval, triangular, polygonal, or the like.

Moreover, the thrust plate 36 includes a first thrust surface 38 which is integral. As used herein, the term thrust surface is a surface of any element which is configured to carry the axial load during operation of the turbocharger 20. Moreover, the thrust surface is a flat surface to ensure that the load is evenly distributed across the entire thrust surface. In turbocharger 20 operation, high pressures are common and a lack of flatness of the thrust surface can lead to much higher localized pressures and premature failure of one or more elements in the thrust bearing assembly 34. In one example, to achieve the desired flatness of the thrust surface, a lapping operation may be performed on the desired surface. In addition to ensuring flatness, lapping has the added benefit of creating the desired surface finishes (i.e., between 0.3-0.8 microns or better). However, it is also contemplated that the desired flatness of the thrust surface may be achieved by another method, such as machining, or the like.

As used herein, the term integral means included as part of the whole, instead of supplied separately. More specifically, each of the integral surfaces is formed directly on and from the respective element and are not distinct surfaces applied separately.

The thrust bearing assembly 34 also includes a bearing 40 having a second thrust surface 42 which is integral. In the example illustrated in FIGS. 3-5, the bearing 40 is disposed towards the turbine wheel 30 from the thrust plate 36. In one example, the bearing 40 is a non-rotating bearing. However, it is also contemplated that the bearing 40 could be a rotating bearing or a semi-rotating bearing, if desired. Additionally, in one example, the bearing 40 is semi-floating bearing. However, it is also contemplated that the bearing 40 could be a full-floating bearing or a non-floating bearing, if desired. In one example, the bearing 40 is comprised of brass. However, it is also contemplated that the bearing 40 may be comprised of another material or a mixture of materials, including, but not limited to, steel, bronze, ceramic, polymer, composite, or the like.

Figure 4:
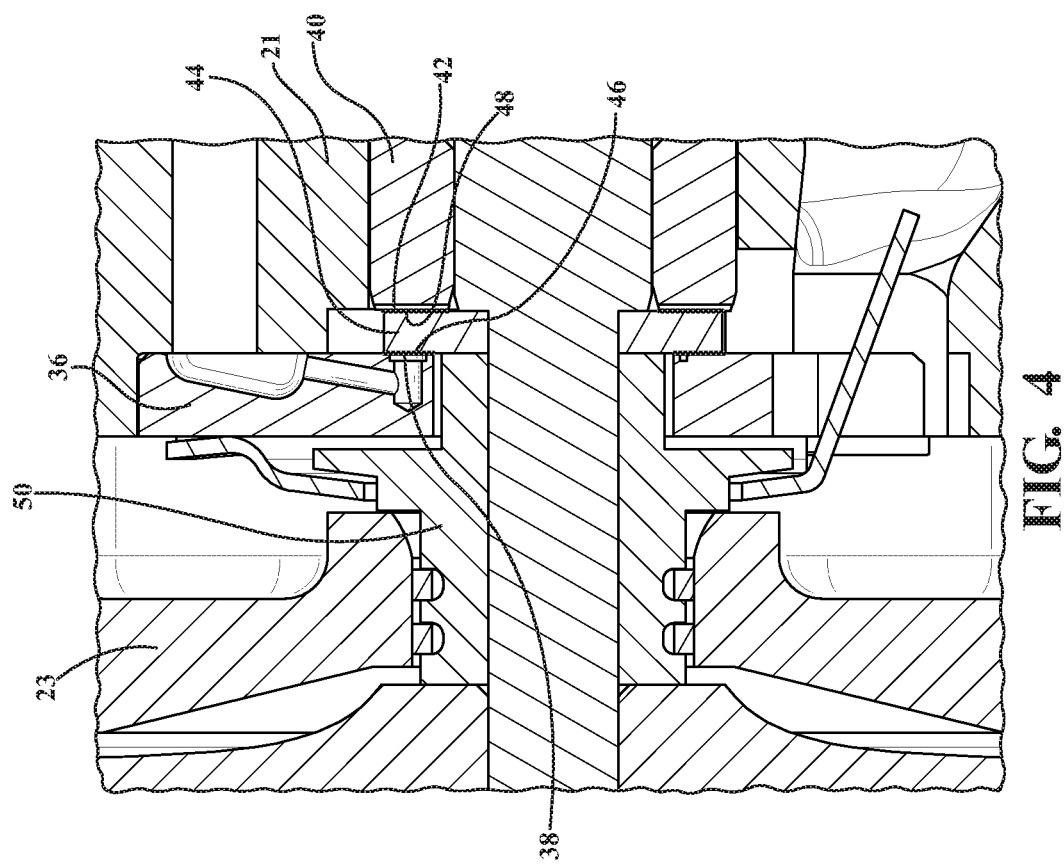
FIG. 4 is a cross-sectional partial view of the thrust bearing assembly.

Referring still to the example illustrated in FIG. 3, the thrust bearing assembly 34 also includes a washer 44. The washer 44 is disposed between the thrust plate 36 and the bearing 40. The washer 44 illustrated in the example shown in FIG. 4 is a typical washer 44 having a generally circular shape, comprised of steel, and defines an aperture in the center. However, it is also contemplated that the washer 44 may be of any shape and/or comprised of bronze, ceramic, or the like. Moreover, it is also contemplated that the washer 44 may not define an aperture and may simply include two opposing parallel surfaces which are connected by a third surface. Typically, the two parallel opposing surfaces have a larger area than the third connecting surface, such that the washer 44 is relatively thin. In some examples, the washer 44 may have a thickness of approximately 1.0-3.0 mm. However, various other sizes, shapes, and thickness have been contemplated.

Moreover, the washer 44 has a third thrust surface 46 which is integral and an opposite fourth thrust surface 48 which is integral. The third thrust surface 46 and the fourth thrust surface 48 are on opposite sides of one another and are disposed parallel to one another. Additionally, the third thrust surface 46 faces the thrust plate 36 for engagement with the first thrust surface 38 of the thrust plate 36. Moreover, the fourth thrust surface 48 of the washer 44 faces the second thrust surface 42 of the bearing 40 for engagement with the second thrust surface 42 of the bearing 40.

In one example, the thrust surface is only on a portion of the surface of the element. For instance, when one surface of the washer 44 is generally circular and defines an aperture in the center, the thrust surface may be disposed only on a portion of the circular surface. In the example illustrated in FIG. 5, the thrust surface is disposed only on a top portion of the washer 44 for both the third thrust surface 46 and the fourth thrust surface 48. However, it is also contemplated that the third thrust surface 46 and/or the fourth thrust surface 48 may be disposed on a lower portion of the washer 44, a side portion of the washer 44, or the entire washer 44.

Figure 5:
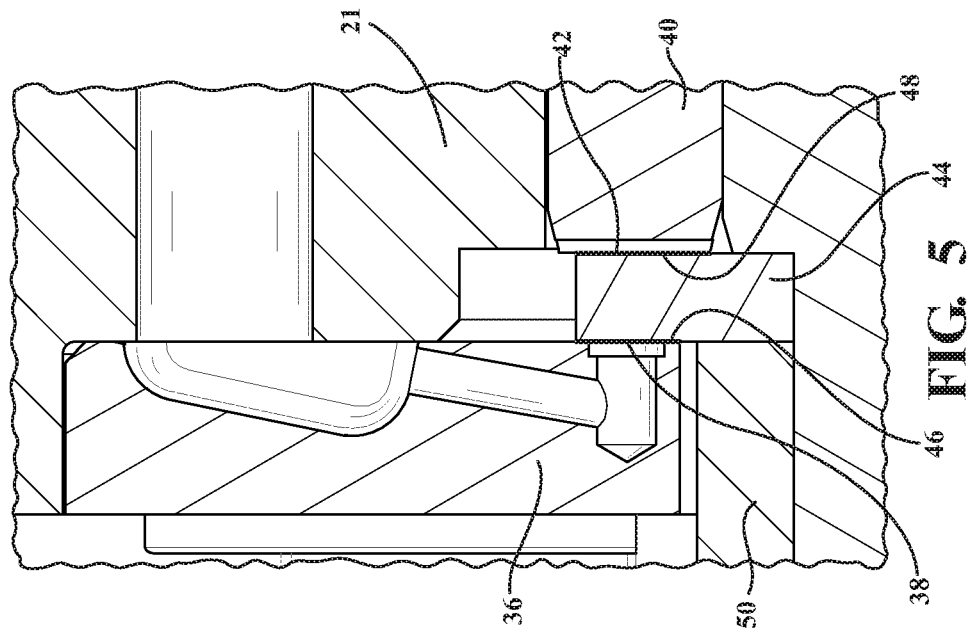
FIG. 5 is another cross-sectional partial view of the thrust bearing assembly.

Referring still to the example illustrated in FIGS. 3-5, the thrust bearing assembly 34 also includes a flinger 50. The flinger 50 is disposed next to the thrust plate 36 and is adjacent to the washer 44 on one side. Moreover, the flinger 50 is configured to evacuate used fluid from the thrust bearing 40 toward a drain disposed in the bearing housing 21. As best illustrated in FIGS. 4 and 5, the flinger 50 has a generally rectangular cross section which extends along the shaft 32 and having one or more protrusions. However, it is also contemplated that the flinger 50 may have another cross-sectional shape, including polygonal, triangular, circular, or the like. In one example, the flinger 50 is comprised of steel. However, it is also contemplated that the flinger 50 may be comprised of another material, including, but not limited to, ceramic, brass, thermoplastic polymers, or the like.

Importantly, in the arrangement of the thrust bearing assembly 34 illustrated in FIGS. 3-5, the flinger 50 does not include a thrust surface. Some prior art flingers 50 may have a thrust surface; however, a flat, integral thrust surface is difficult to achieve. Having an arrangement of the thrust bearing assembly 34 which does not include having a thrust surface on the flinger 50 reduces production costs and timing and also improves vehicle performance due to non-conforming thrust surfaces.

In one example, the thrust plate 36 defines a channel configured to allow fluid to be directed towards the first thrust surface 38 of the thrust plate 36 and the third thrust surface 46 of the washer 44. The fluid may be any type of lubricant including but not limited to oil, transmission fluid, and the like. The fluid provides the necessary lubrication between the washer 44 and the thrust plate 36 to support an axial load. The fluid then flows between the flinger 50 and the thrust plate 36 parallel to the shaft 32. The fluid then flows adjacent the thrust plate 36 on an opposite surface of the first thrust surface 38 of the thrust plate 36 where it is then distributed to a drain in the turbocharger 20. Having the fluid flow within the thrust bearing assembly 34, as described above forces fluid toward the second thrust surface 42 of the bearing 40 with limited risk for extra fluid flow. More specifically, in traditional thrust bearing assemblies having thrust loads reacting on both sides of the bearing, the side of the bearing which is not receiving the load consumes more fluid than the side of the bearing which receives the load. By employing the current configuration of the thrust bearing assembly 34, no fluid flow on the side of the bearing 40 which does not have the thrust surface. Therefore, less fluid flow is needed overall which minimizing the risk for leakage.

In operation, the turbine wheel 30 of the turbocharger 20 extracts energy from exhaust gas from the engine, and the extracted energy is transferred to the compressor wheel 31. The compressor wheel 31 operates to increase an intake air density into the engine. During operation, axial forces act on the thrust bearing assembly 34 in both a turbine wheel 30 direction and in a compressor wheel 31 direction. The thrust surfaces of the washer 44, bearing 40, and thrust plate 36 are configured to engage one other to support the load of the axial forces. More specifically, during operation, the first thrust surface 38 engages the third thrust surface 46 to support the axial load on the thrust bearing assembly 34 along the longitudinal axis A in a first direction. Moreover, during operation, the second thrust surface 42 engages the fourth thrust surface 48 to support the axial load on the thrust bearing assembly 34 along the longitudinal axis A in a second direction. In one example, the second direction is opposite the first direction. In one example, the first direction is in a direction of the compressor wheel 31 and the second direction is in a direction of the turbine wheel 30. However, it is also contemplated that the first direction may be another direction including but not limited to the direction of the turbine wheel 30 and/or that the second direction may be another direction including but not limited to the direction of the compressor wheel 31. It is further contemplated that during operation in the compressor wheel 31 direction, the second thrust surface 42 and the fourth thrust surface 48 may also be engaged and that during operation in the turbine wheel 30 direction, the first thrust surface 38 and the third thrust surface 46 may also be engaged to help support the axial load.

The configuration of the thrust bearing assembly 34 creates an optimized thrust bearing system for withstanding axial forces in both directions, particularly in the compressor direction, where the thrust load is higher. Having a third thrust surface 46 and a fourth thrust surface 48 on the washer 44 also eliminates the need for a thrust surface on the flinger 50. By eliminating the thrust surface on the flinger 50, the flinger 50 can have significantly smaller dimensions, which leads to a thrust bearing assembly 34 having a smaller size in the axial direction along with weight reduction, which leads to enhanced vehicle performance and cost reduction. Additionally, the configuration of the thrust bearing assembly 34 allows for less fluid needed during operation reducing the risk of undesirable fluid leakage. Moreover, the arrangement of the thrust bearing assembly 34 as described herein reduces production costs and shortens production times. Moreover, vehicle performance is enhanced due to easily produced, optimized thrust surfaces.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger comprising:
a bearing housing defining an interior;
a shaft disposed in said interior with said shaft extending along a longitudinal axis; and
a thrust bearing assembly disposed about said shaft, said thrust bearing assembly comprising:
a thrust plate defining a bore configured to receive said shaft and having a first thrust surface which is integral;
a bearing having a second thrust surface which is integral, wherein said bearing is a non-rotating and semi-floating bearing; and
a washer disposed between said thrust plate and said bearing, said washer having a third thrust surface which is integral and an opposite fourth thrust surface which is integral, wherein said third thrust surface faces said first thrust surface for engagement with said first thrust surface for supporting an axial load along said longitudinal axis in a first direction and said fourth thrust surface faces said second thrust surface for engagement with said second thrust surface for supporting an axial load along said longitudinal axis in a second direction, opposite the first direction.

2. The turbocharger of claim 1, wherein said third thrust surface and said fourth thrust surface are disposed parallel to one another.

3. The turbocharger of claim 1, further comprising a flinger disposed about said shaft and adjacent to said washer, wherein said flinger is free of an integral thrust surface.

4. The turbocharger of claim 1, wherein said bearing is comprised of brass.

5. The turbocharger of claim 1, wherein said bearing includes only one thrust surface.

6. The turbocharger of claim 1, wherein said thrust plate includes only one thrust surface.

7. A thrust bearing assembly for use in a turbocharger having bearing housing defining an interior and a shaft disposed in the interior with the shaft extending along a longitudinal axis and said thrust bearing assembly being disposed about said shaft, said thrust bearing assembly comprising:
a thrust plate defining a bore configured to receive said shaft and an integral first thrust surface;
a bearing having an integral second thrust surface, wherein said bearing is a non-rotating and semi-floating bearing; and
a washer disposed between said thrust plate and said bearing, said washer having a third thrust surface which is integral and an opposite fourth thrust surface which is integral, wherein said third thrust surface faces said first thrust surface for engagement with said first thrust surface for supporting an axial load along said longitudinal axis in a first direction and said fourth thrust surface faces said second thrust surface for engagement with said second thrust surface for supporting an axial load along said longitudinal axis in a second direction.

8. The thrust bearing assembly of claim 7, wherein said third thrust surface and said fourth thrust surface are disposed parallel to one another.

9. The thrust bearing assembly of claim 7, further comprising a flinger disposed about said shaft and adjacent to said washer, and wherein said flinger is free of an integral thrust surface.

10. The thrust bearing assembly of claim 7, wherein said bearing is comprised of brass.

11. The thrust bearing assembly of claim 7, wherein said bearing includes only one thrust surface.

12. The thrust bearing assembly of claim 7, wherein said thrust plate includes only one thrust surface.

* * * * *